FIG.1

United States Patent Office 3,437,512
Patented Apr. 8, 1969

3,437,512
RADIATION CURABLE CYCLIC SILICONE-MODIFIED PAINT BINDERS
William J. Burlant, Detroit, and Ivan H. Tsou, Pontiac, Mich., assignors to Ford Motor Company, Dearborn, Mich., a corporation of Delaware
Filed Aug. 13, 1965, Ser. No. 479,445
Int. Cl. G03g 13/00; B44d 1/36
U.S. Cl. 117—93.31                            22 Claims

ABSTRACT OF THE DISCLOSURE

A radiation polymerizable paint binder solution of a polysiloxane modified organic resin in vinyl monomers. The paint binder resin of this invention has a molecular weight in excess of about 1,000, contains about 0.5 to about 3 alpha-beta olefinic unsaturation units per 1,000 units molecular weight, and is further characterized in that at least 10 wt. percent thereof is derived from a cyclic siloxane.

---

Figure 2:
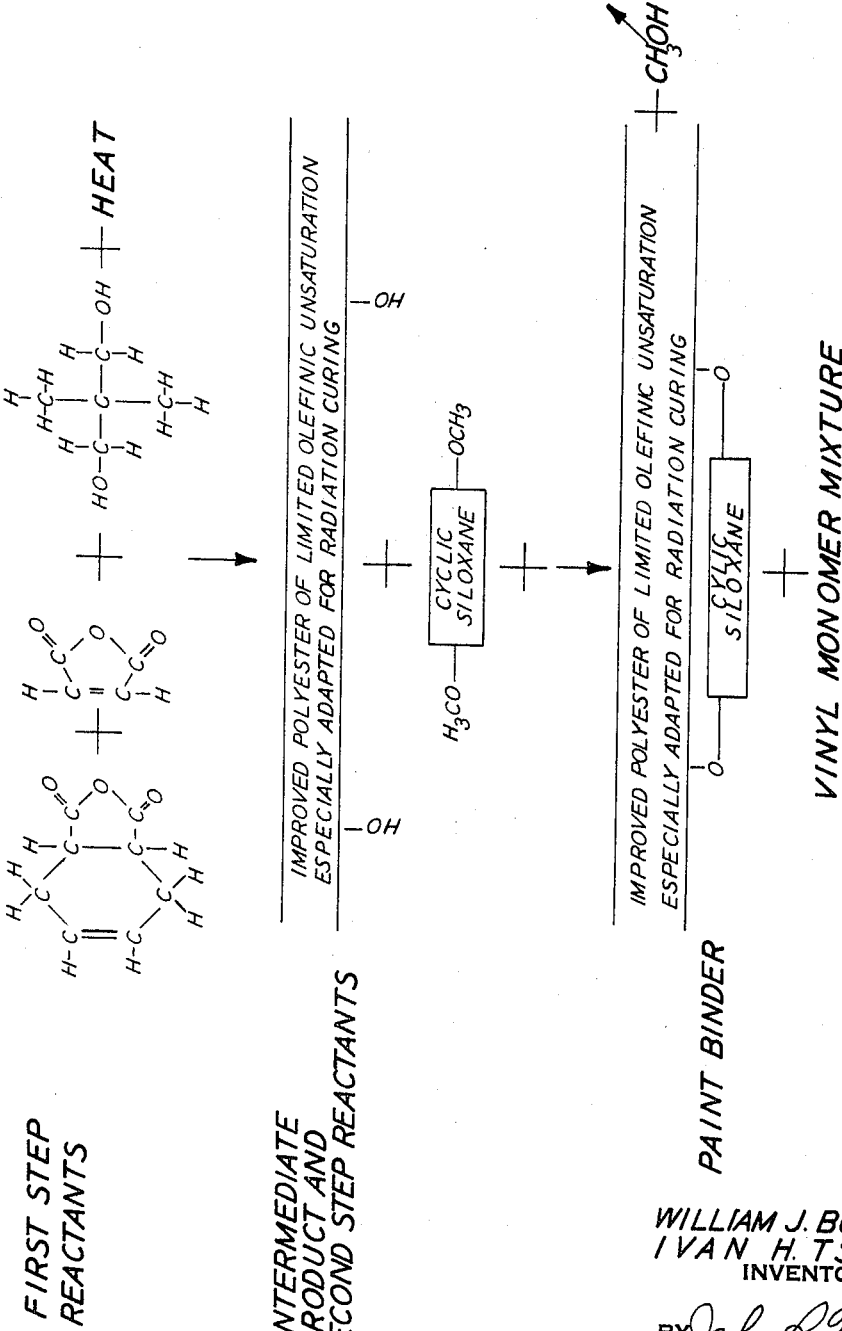

This invention relates to the art of coating and is primarily concerned with method and means for providing articles of manufacture, particularly wood and/or metal surfaces thereof with decorative and weather resistant coatings, including improved paints for such purpose, their preparation, application to a substrate and polymerization thereon. More particularly, this invention relates to an improved paint binder comprising an improved silicone-modified, organic resin and a vinyl monomer which are copolymerizable by ionizing radiation.

In this application the term "paint" is meant to include finely ground pigment and/or filler in the binder, the binder without pigment and/or filler or having very little of the same, which can be tinted if desired, and other surface coating compositions containing the binder which might be considered to be broadly analogous to enamel, varnish, or lacquer bases. Thus, the binder, which is ultimately converted to a durable film can be all or virtually all that is used to form the film, or it can be a vehicle for pigmentary and/or mineral filler material.

The term "ionizing radiation" as employed herein means radiation having sufficient energy to remove an electron from a gas atom, forming an ion pair, and hence radiation with energy of, or equivalent to about 5,000 electron volts is operative for effecting polymerization of the paint films herein disclosed. The preferred method of curing films of the instant paint binders upon the substrates to which they have been applied is by subjecting such films to a beam of polymerization effecting electrons which at its source of emission is within the range of, or equivalent to, 150,000 to 450,000 electron volts. In this method of curing, it is preferred to employ a minimum of 25,000 electron volts per inch of distance between the radiation emitter and the workpiece where the intervening space is occupied by air. Adjustment is made for the relative resistane of the intervening gas which is preferably an oxygen-free, inert gas such as nitrogen or helium. It is, however, within the scope of this invention to effect polymerization using either that which is conventionally termed "high energy particle radiation" or "ionizing electromagnetic radiation."

The paint binders of this invention comprise an improved, silicone-modified, organic resin having a molecular weight in excess of about 1,000, advantageously about 1,000 to about 50,000, and preferably about 2,000 to about 20,000, and about 0.5 to about 3, preferably about 1 to about 2, and more preferably about 1.25 to about 1.75 olefinic unsaturation units per 1,000 units molecular weight, and at least one, preferably two dissimilar vinyl monomers, e.g., a vinyl hydrocarbon such as styrene and an acrylic monomer such as methyl methacrylate. The term "vinyl" as employed herein refers to an organic compound having a

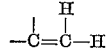

terminal group.

The films formed from the preferred embodiments of the paints of this invention are cured at relatively low temperatures, e.g., between room temperature (20 to 25° C.) and the temperature at which significant vaporization of its most volatile component is initiated, ordinarily between 20° and 70° C. The radiation energy is applied at dose rates of about 0.1 to about 100 mrads per second upon a preferably moving workpiece with the coating receiving a total dose in the range of about 0.1 to about 100, preferably about 1 to 25, mrads. Such films are converted by the electron beam into tenaciously bound, wear and weather resistant, coatings which meet the following specifications:

| Substrate applicability | Type of exposure | Requirements of test |
|---|---|---|
| Wood or metal | Room temperature water soak. | Withstand 240 hours immersion in water at 20 to 25° C. (68 to 77° F.) without significant loss of gloss or film integrity, i.e. without blistering, checking, cracking or peeling. |
| Wood | Cyclic boiling and baking. | Withstand 25 cycles, each 4 hours immersion in boiling water followed by 15 hours drying at 62 to 63° C. (about 144 to about 146° F.), without significant loss of gloss or film integrity. |
| Metal | Elongation | Withstand 25% elongation without rupture, 1 to 2 mil coating, ⅛″ mandrel. |
| Wood or metal | Ultraviolet | Withstand 2,000 hours exposure in Standard Atlas Ultraviolet Carbon Arc Weatherometer test without significant chalking and without loss of gloss or film integrity. |

The preferred silicone-modified resins employed herein are polyester type resins with the aforementioned degree of unsaturation, a molecular weight in excess of about 1,000, and having incorporated therein a cyclic siloxane having prior to its incorporation a reactive hydroxyl or hydrocarbonoxy group bonded to at least two of its silicon atoms. The term "siloxane" as employed herein refers to a compound containing a

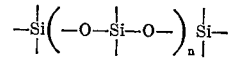

linkage, where $n$ is a positive integer, with the remaining valences being satisfied by a hydrocarbon radical, a hydrocarbonoxy group, hydrogen, a hydroxyl group, or an oxygen atom which interconnects the silicon atom providing such valence with another silicon atom. The suitable cyclic siloxane molecules for use in this invention contain at least 3, preferably 6 to 12, and ordinarily not more than 18, silicon atoms per molecule with corresponding oxygen linkages. The cyclic polysiloxanes may take the form of one of the following type formulas:

(I) $\qquad X_{n'}Si_nO_{n''}$ where:
$n$ = an odd numbered positive integer of at least 3,
$n' = 2n$, and
$n'' = n$
$X$ = (a) a $C_1$ to $C_8$ monovalent hydrocarbon radical, preferably a $C_1$ to $C_4$ alkyl radical, or (b) a $C_1$ to $C_8$ monovalent hydrocarbonoxy radical, preferably a $C_1$ to $C_4$ alkoxy radical, or (c) a hydroxyl radical, or (d) hydrogen—with at least two of the X groups separated by a

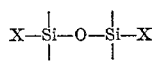

linkage being either (b) or (c)

Exemplified by the following formula:

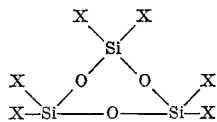

(II)      $X_{n'}Si_nO_{n''}$ where:

$n=$ an odd numbered positive integer of at least 5,
$n'=n+3$, and
$n''=6, 6+3,$ or $6+$ a multiple of 3
$X=$ (a) a $C_1$ to $C_8$ monovalent hydrocarbon radical, preferably a $C_1$ to $C_4$ alkyl radical, or (b) a $C_1$ to $C_8$ monovalent hydrocarbonoxy radical, preferably a $C_1$ to $C_4$ alkoxy radical, or (c) a hydroxyl radical, or (d) hydrogen—with at least two of the X groups separated by a

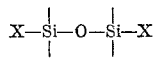

linkage being either (b) or (c)

Exemplified by the following structural formula:

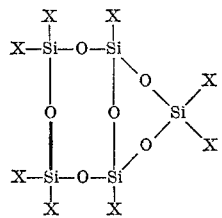

(III)      $X_{n'}Si_nO_{n''}$ where:

$n=6$ or a multiple of 6,
$n'=8, 8+6,$ or $8+$ a multiple of 6
$n''=8, 8+9,$ or $8+$ a multiple of 9
$X=$ (a) a $C_1$ to $C_8$ monovalent hydrocarbon radical, preferably a $C_1$ to $C_4$ alkyl radical, or (b) a $C_1$ to $C_8$ monovalent hydrocarbonoxy radical, preferably a $C_1$ to $C_4$ alkoxy radical, or (c) a hydroxyl radical, or (d) hydrogen—with at least two of the X groups separated by a

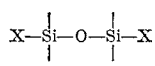

linkage being either (b) or (c)

Exemplified by the following structural formula:

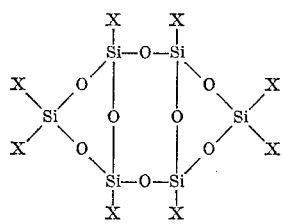

or a condensation dimer, trimer, etc., thereof formed with less of water or alcohol.

(IV)      $X_{n'}Si_nO_{n''}$ where:

$n=$ an even numbered positive integer of at least 4,
$n'=n+4$, and
$n''=4, 4+3,$ or $4+$ a multiple of 3
$X=$ (a) a $C_1$ to $C_8$ monovalent hydrocarbon radical, preferably a $C_1$ to $C_4$ alkyl radical, or (b) a $C_1$ to $C_8$ monovalent hydrocarbonoxy radical, preferably a $C_1$ to $C_4$ alkoxy radical, or (c) a hydroxyl radical, or (d) hydrogen—with at least two of the X groups separated by a

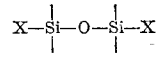

linkage being either (b) or (c)

Exemplified by the following structural formula:

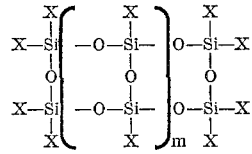

where $m$ is 0 or a positive integer.

(V)      $X_{n'}Si_nO_{n''}$ where:

$n=$ an even numbered positive integer of at least 8,
$n'=n+2$, and
$n''=11, 11+3,$ or $11+$ a multiple of 3
$X=$ (a) a $C_1$ to $C_8$ monovalent hydrocarbon radical, preferably a $C_1$ to $C_4$ alkyl radical, or (b) a $C_1$ to $C_8$ monovalent hydrocarbonoxy radical, preferably a $C_1$ to $C_4$ alkoxy radical, or (c) a hydroxyl radical, or (d) hydrogen—with at least two of the X groups separated by a

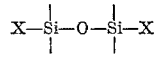

linkage being either (b) or (c)

Exemplified by the following structural formula:

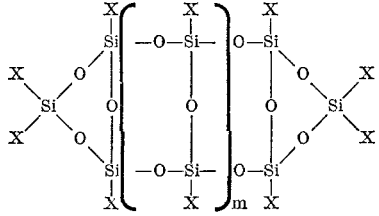

where $m$ is a positive integer.

A variety of methods are known to the art for preparing siloxanes. The most commonly disclosed method is controlled hydrolysis of silanes. Others include polymerization of a lower molecular weight cyclic siloxane in the presence of a dialkoxysilane, e.g. U.S. Patent 2,909,549, reacting silicon tetrachloride with an alcohol, U.S. Patent 2,877,202, etc. Cyclic siloxanes are disclosed among other places in the last referred to patent which also contains considerable discussion of alkoxysiloxanes in general. Hydroxylated siloxanes are disclosed among other places in U.S. Patent 2,973,287.

The starting resin or monomer with which the siloxane is reacted preferably contains a minimum of hydroxyl groups over the number required to react with the reactive hydroxyl or hydrocarbonoxy groups on the siloxane molecules to be incorporated in the resin. At least two of such reactive groups on the siloxane should be reacted with the starting resin or monomer and in one embodiment remaining hydroxyl or hydrocarbonoxy groups upon the siloxane are subsequently reacted with another monomer as hereinafter more fully explained. The final resin prior to its radiation copolymerization with vinyl monomers advantageously contains from about 15 to about 50, preferably about 20 to about 40, wt. percent silicones, i.e. structure derived from siloxanes.

In one preferred embodiment a silicon-modified polyester type resin is prepared by first reacting the cyclic siloxane with a polyhydric alcohol, preferably a branched chain polyhydric alcohol such as neopentyl glycol, and subseqently reacting the first product with an acyclic, alpha-beta unsaturated, dicarboxylic acid or the anhydride thereof, e.g. maleic anhydride, and a cyclic, aliphatic, dicarboxylic acid or its anhydride, e.g. tetrahydrophthalic anhydride.

In another embodiment the polyester is formed first by reacting the aforementioned polyhydric alcohol, the acyclic, alpha-beta unsaturated, dicarboxylic acid or anhydride and the cyclic, aliphatic, dicarboxylic acid or anhydride either with or without a straight chain polyhydric alcohol, e.g. a propane or butane diol, and subsequently reacting this product with the siloxane.

In another embodiment an unsaturated polyester is formed as in the previously described embodiments or a saturated type polyester is formed by substituting a saturated acyclic dibasic acid such as succinic acid for the maleic anhydride and after reaction of the siloxane with monomer or polymer as the case may be, the remaining hydroxyl or hydrocarbonoxy groups on the siloxane are reacted with suitably unsaturated hydroxylated monomers or low molecular weight esters, e.g. the reaction product of maleic anhydride and a polyhydric alcohol, provide the desired unsaturation for polymerization.

In another embodiment a hydroxylated vinyl resin is prepared by reacting vinyl monomers, e.g. acrylic acid, methacrylic acid and esters thereof, at least one of which is a hydroxylated monomer such as 2-hydroxyethyl methacrylate, a portion of the hydroxyl or hydrocarbonoxy groups of the siloxane are reacted with the hydroxyl groups of the resin and the remainder are subsequently reacted with a hydroxylated unsaturated compound.

In the accompanying drawing, there is schematically illustrated two methods for carrying out the process of this invention.

The silicone-modified resins in the exemplary paint binders each have molecular weights in excess of 1,000, a degree of unsaturation as hereinbefore defined and when applied and cured in accordance with this invention meet the specifications hereinbefore set forth:

EXAMPLE 1

A silicone-modified polyester, paint binder resin is prepared in the following manner:

To a reaction vessel are charged 70 lbs. of neopentyl glycol, 10 lbs. of xylene, and 35 lbs. of a commercially available (Dow Corning Z–6018) hydroxy-functional, cyclic, polysiloxane having the following properties:

Hydroxy content, Dean-Stark:
    Percent condensible _____ 5.5
    Percent free _____ 0.5
Average molecular weight_____ 1600
Combining weight _____ 400
Refractive index _____ 1.531–1.539
Softening point, Durran's Mercury Method,
    degrees F. _____ 200

At 60% solids in xylene

Specific gravity at 77° F._____ 1.075
Viscosity at 77° F., centipoises_____ 33
    Gardner-Holdt _____ A–1

The charge is heated to about 345° F. (174° C.) for 2½ hours, after which there is added 13.7 lbs. maleic anhydride, 54.2 lbs. of tetrahydrophthalic anhydride and 100 grams of dibutyl tin oxide. The temperature of the charge is raised slowly to about 430° F. (221° C.) and this tempearture is maintained until the resulting resin has an acid number of about 10. Some of the xylene and water of reaction are removed during the cook and the excess is then removed by vacuum. To the charge is added 12.5 grams hydroquinone and the charge is cooled to 180° F. (82.5° C.) and diluted with 40 lbs. of styrene.

A white mill base is then prepared by mixing 3050 lbs. of $TiO_2$, 1805 lbs. of resin, prepared as in the preceding paragraph, 146 lbs. of styrene, 507 lbs. of methyl methacrylate, and 20 lbs. of Bakers M.P.A., a wax-like, high molecular weight, castor oil derivative to facilitate the grinding through viscosity adjustment and assist in retention of pigment dispersion in the grind, and passing the foregoing mixture through a conventional sand grinder.

This mill base is further diluted with styrene and methyl methacrylate in amounts such as to provide a paint comprising about 40% resin, 30% styrene and 30% methyl methacrylate. A film of the resulting paint is sprayed upon wood and metal panels and irradiated by an electron beam under the following conditions:

Potential _____kv__ 295
Current _____milliamperes__ 1
Distance, emitter to workpiece _____inches__ 10
Line speed _____cm./sec__ 1.6
Passes _____ 2
Total dosage _____mrads__ 10

EXAMPLE 2

A silicone-modified polyester, paint concentrate is prepared from the following components:

Parts by weight
White mill base from Example 1 _____ 5565
Silicone-modified polyester resin prepared as in
    Example 1 _____ 1785
Styrene _____ 1100
Methyl methacrylate _____ 1552
Red mill base _____ 198

The red mill base above referred to is prepared by first admixing 130 parts by weight of a 50% xylene solution of a conventional acrylic paint binder resin (Gardner-Holdt vis. at 77° F. WX), 400 parts by weight burnt sienna pigment, and 130 parts by weight xylene. This mixture is ground for 40 hours in a steel ball mill to a fineness of 8 Heg. after which 340 parts by weight of the same acrylic resin are added.

The above referred to paint concentrate is diluted with styrene and methyl methacrylate to provide a paint containing about 40% resin, 30% styrene, 30% methyl methacrylate, sprayed on wood and metal panels and irradiated as in the previous example.

EXAMPLE 3

The procedure of Example 2 is repeated using the following materials to prepare the paint concentrate:

Parts by weight
White mill base from Example 1 _____ 5680
Silicone-modified polyester resin prepared as in Example 1 _____ 1676
Styrene _____ 1050
Methyl methacrylate _____ 1527
Green mill base _____ 267

The green mill base above referred to is prepared by first admixing 120 parts by weight of a 50% xylene solution of a conventional acrylic paint binder resin (Gardner-Holdt vis. at 77° F. WX), 60 parts by weight phthalocyanine green, 61 parts by weight xylene. This mix is ground 48 hours in a steel ball mill to 8 Heg. after which 240 parts by weight of the acrylic polymer above mentioned and 60 parts by weight xylene are added and the mix is ground for an additional 2 hours. To the latter grind is added 264 parts by weight of the same acrylic polymer, 130 parts by weight of butylated melamine formaldehyde resin (60% solids, 20% xylene, 20% butanol) and 65 parts by weight xylene.

The paint concentrate thus prepared is diluted with styrene and methyl methacrylate to provide paints containing the following:

| Resin, percent | Styrene, percent | Methyl methacrylate, percent |
|---|---|---|
| 60 | 20 | 20 |
| 50 | 20 | 30 |
| 50 | 30 | 20 |
| 40 | 30 | 30 |

These paints are sprayed on wood and on metal panels and cured by irradiation as in the preceding examples.

EXAMPLE 4

The procedure of Example 1 is repeated except for the difference that the neopentyl glycol, the maleic anhydride and the tetrahydrophthalic anhydride are reacted together and the product is subsequently reacted with the siloxane.

EXAMPLE 5

The procedure of Example 1 is repeated except that a methoxy-functional, cyclic, siloxane is substituted for the hydroxy-functional, cyclic, siloxane previously used. In this reaction the byproduct is methanol. This siloxane contains 6 silicon atoms and corresponds to type Formula IV in column 3, line 71. This procedure is repeated using dipropoxy tetramethylcyclotrisiloxane.

EXAMPLE 6

A resin is prepared from the following monomers:

| | Mols | Grams |
|---|---|---|
| Maleic anhydride | 3.6 | 353 |
| Tetrahydrophthalic anhydride | 6.4 | 973.8 |
| Neopentyl glycol | 9.395 | 978.49 |
| Diallylether of pentaerythritol | 2.81 | 607.8 |

A fusion cook of the neopentyl glycol and the tetrahydrophthalic anhydride is caried out over a 21-hour period. Water comes over at about 157° C. and a maximum temperature of about 205° C. is recorded. The resulting resin has an acid number of about 17. The maleic anhydride and the diallylether of pentaerythritol are added with about 1.46 grams hydroquinone and the charge is heated for about 13 hours. Water comes over at about 140° C. and a maximum temperature of about 186° C. is recorded.

A 25% silicone-modified resin is prepared using 503.6 grams of the above resin and 167.8 grams of the hydroxy-functional, cyclic siloxane used in Example 1, the hydrocarbon groups of which are predominantly phenyl groups. These materials are heated together for about 2.5 hours. Water comes over at about 139° C. and a maximum temperature of about 160° C. is recorded. The charge is cooled rapidly to about 100° C. at which time 0.112 gram hydroquinone is added with stirring and at about 80° C., 223.8 grams styrene are added.

A paint binder is prepared from 50 parts by weight of the foregoing silicone-modified resin, 25 parts by weight styrene and 25 parts of methyl methacrylate. This binder is sprayed upon wood and metal panels and irradiated as in the previous examples. The cured paint binder exhibits a Sward hardness after 2 passes of about 28–30 (about 10 mrads) and after 4 passes about 56–58 (about 20 mrads).

A pigmented paint is prepared by first preparing a mill base using the following ingredients:

| | Grams |
|---|---|
| TiO$_2$ | 600 |
| Silicone-modified resin, this example | 300 |
| Styrene | 100 |
| Methyl methacrylate | 100 |

This material is pebble ground for 20 hours and a paint is prepared from the following ingredients:

| | Grams |
|---|---|
| Above mill base | 100 |
| Silicone-modified resin, this example | 19.4 |
| Methyl methacrylate | 23.4 |
| Styrene | 18.57 |
| 2-hydroxy-4-actyloxy benzophenone (UV) absorber) | 0.557 |

This paint is sprayed upon wood and metal panels and irradiated as in the preceding examples. This paint exhibits a Sward hardness of about 26 after 2 passes.

EXAMPLE 7

A 50% silicone-modified resin is prepared in the following manner:

The original polyester resin is prepared from the following ingredients:

| | Mols | Grams |
|---|---|---|
| Maleic anhydride | 3.24 | 317.7 |
| Tetrahydrophthalic anhydride | 5.76 | 876.4 |
| Neopentyl glycol | 10.67 | 1111.3 |
| Diallylether of pentaerythritol | 3.03 | 655.4 |
| Hydroquinone | | 1.48 |

The same order of cooking is employed as in the preceding example. The cook is carried out over a period of 31 hours to an acid number of 10 with water over at about 147° C. and a maximum temperature of 190° C. is recorded.

Equal parts by weight (375.8) of the foregoing resin and the siloxane of Example 1 are heated together for 2.5 hours with water over at about 135° C. and a maximum temperature of 173° C. recorded. The charge is cooled to about 100° C. at which time 0.124 part by weight of hydroquinone is added. The charge is further cooled to 80° C. at which time 247.9 parts by weight of styrene are added.

A paint binder consisting of 50 parts by weight of the above 50% silicone-modified resin, 37.5 parts by weight styrene, and 37.5 parts by weight methyl methacrylate are sprayed upon test panels and irradiated as in the previous examples. The binder exposed to 2 passes (10 mrads) demonstrates a Sward hardness of about 44–48.

EXAMPLE 8

The procedure of Example 1 is repeated except that the potential of the electron beam is 175,000 electron volts with the exposure controlled to provide a total dose equivalent to that of Example 1.

EXAMPLE 9

The procedure of Example 1 is repeated except that the potential of the electron beam is about 400,000 volts and the exposure is controlled to provide a total dose equivalent to that of Example 1.

The abbreviation "mrads" as employed herein means 1,000,000 rads. The term "rads" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛" in diameter at this point, is then scanned in one direction to make a fan-shaped beam and then passed through a metal window, e.g. a magnesium-thorium alloy of about 0.003" thickness.

The binder is preferably applied to the substrate and cured thereon as a continuous film of substantially even depth, preferably a depth in the range of about 0.1 to about 4.0 mils depending upon the substrate and the intended end use of the coated product. The paint binder solution advantageously contains about 30 to about 70, preferably 40 to 60, percent of the silicone modified binder resin and about 30 to about 70, preferably 40 to 60, percent of the unpolymerized vinyl monomers. In a preferred embodiment the vinyl monomers of the paint binder are a mixture of about 30 to 70, preferably 40 to 60, and more preferably 45 to 55, percent acrylic monomers with the balance non-acrylic vinyl monomers. For example, increased weathering resistance can be obtained by increased concentration of an acrylic monomer such as methyl methacrylate while a lowering of the requisite radiation dosage can be obtained by increasing the concentration of a vinyl hydrocarbon monomer such as styrene and the respective quantities of such monomers may be adjusted to fit the individual need. The paint binder may be applied to the substrate by conventional spray techniques, by brushing, roll coating, flow coating, or by the method commonly termed the silk screen process with appropriate adjustment in viscosity. The film-forming material should have a viscosity low enough to permit rapid application to the subsrtate in substantially even depth and high enough so that a 1 mil (.001″) film will hold upon a vertical surface without sagging. The viscosity of the binder is adjusted by varying the molecular weight of the resin or resins and/or by varying the relative concentrations of the resin component and/or by varying the relative concentrations of dissimilar monomers within the monomer component. The binder is preferably applied to the substrate essentially free of non-polymerizable organic solvents and/or diluents.

The term "olefinic unsaturation" as used herein refers to the alpha-beta unsaturated acid or anhydride thereof.

It will be understood by those skilled in the art that modifications can be made within the forgoing examples within the scope of the invention as hereinbefore described and hereinafter claimed.

We claim:

1. A method of coating a substrate which comprises applying to said substrate a film of paint binder comprising a film-forming solution of a silicone-modified organic resin in vinyl monomers copolymerizable with said resin by ionizing radiation, said resin having a molecular weight in excess of about 1,000 and containing about 0.5 to about 3 olefinic unsaturation units per 1,000 units molecular weight and being further characterized in that at least 10 wt. percent thereof is derived from a cyclic siloxane, and copolymerizing said resin and said vinyl monomers upon said substrate with ionizing radiation.

2. A method of coating a substrate which comprises applying to said substrate a film of paint binder comprising a film-forming solution of a silicone-modified polyester resin in vinyl monomers copolymerizable with said resin by ionizing radiation, said resin having a molecular weight in excess of about 1,000 and containing about 0.5 to about 3 olefinic unsaturation units per 1,000 molecular weight and being further characterized in that at least 10 wt. percent thereof is derived from an $Si_3$ to $Si_{18}$ cyclic siloxane, and copolymerizing said resin and said vinyl monomers upon said substrate with polymerization effecting electrons.

3. A method of coating a substrate which comprises applying to said substrate a film of paint binder comprising a film-forming solution of a silicon-modified polyester resin in vinyl monomers copolymerizable with said resin by ionizing radiation, said resin having a molecular weight in the range of about 2,000 to about 20,000 and containing about 0.5 to about 3 olefinic unsaturation units per 1,000 units molecular weight and being further characterized in that about 15 to about 50 wt. percent thereof is derived from a cyclic siloxane, and copolymerizing said resin and said vinyl monomers upon said substrate with polymerization effecting electrons.

4. A method of coating a substrate which comprises applying to said substrate a film of paint binder comprising a film-forming solution of a silicone-modified organic resin in vinyl monomers copolymerizable with said resin by ionizing radiation, said resin having a molecular weight in the range of about 1,000 to about 50,000 and containing about 0.5 to about 3 olefinic unsaturation units per 1,000 units molecular weight and being further characterized in that at least 10 wt. percent thereof is derived from a cyclic siloxane, and copolymerizing said resin and said vinyl monomers upon said substrate with polymerization effecting electrons at a potential in the range of about 150,000 to about 450,000 electron volts.

5. A method of coating a substrate which comprises applying to said substrate a film of paint binder comprising a film-forming solution of a silicon-modified polyester resin in vinyl monomers copolymerizable with said resin by ionizing radiation, said resin having a molecular weight in excess of about 1,000 and containing about 1 to about 2 olefinic unsaturated units per 1,000 units molecular weight and being further characterized in that about 15 to about 50 wt. percent thereof is derived from an $Si_3$ to $Si_{18}$ cyclic siloxane, and copolymerizing said resin and said vinyl monomers upon said substrate with polymerization effecting electrons at a potential in the range of about 150,000 to about 450,000 electron volts.

6. A method of coating a substrate which comprises applying to said substrate a film of paint binder having an average depth in the range of about 0.1 to about 4 mils and comprising a film-forming solution of a silicon-modified polyester resin in vinyl monomers copolymerizable with said resin by ionizing radiation, said resin having a molecular weight in excess of about 1,000 and containing about 1.25 to about 1.75 olefinic unsaturation units per 1,000 units molecular weight and being further characterized in that about 20 to about 40 wt. percent thereof is derived from an $Si_6$ to $Si_{12}$ cyclic siloxane, and copolymerizing said resin and said vinyl monomers upon said substrate with polymerization effecting electrons at a potential in the range of about 150,000 to about 450,000 electron volts.

7. A method of coating a substrate which comprises applying to said substrate a film of paint binder having an average depth in the range of about 0.1 to about 4 mils and comprising a film-forming solution of a silicone-modified polyester resin in vinyl monomers copolymerizable with said resin by ionizing radiation, said resin having a molecular weight in excess of about 1,000 and containing about 0.5 to about 3 olefinic unsaturation units per 1,000 units molecular weight and being further characterized in that about 15 to about 50 wt. percent thereof is derived from a cyclic siloxane, said vinyl comprising a monomer mixture of acrylic monomers and vinyl hydrocarbon monomers, and copolymerizing said resin and said vinyl monomers upon said substrate with polymerization effecting electrons at a potential in the range of about 150,000 to about 450,000 electron volts.

8. A method of coating a substrate which comprises applying to said substrate a film of paint binder having an average depth in the range of about 0.1 to about 4 mils and comprising a film-forming solution of a silicone-modified polyester resin in vinyl monomers copolymerizable with said resin by ionizing radiation, said resin having a molecular weight in the range of about 2,000 to about 20,000 and containing about 1 to about 2 olefinic unsaturation units per 1,000 units molecular weight and being further characterized in that about 20 to about 40 wt. percent thereof is derived from an $Si_3$ to $Si_{18}$ cyclic siloxane, said vinyl monomers comprising a monomer mixture of about 40 to about 60 wt. percent acrylic monomers and about 40 to about 60 wt. percent vinyl hydrocarbon monomers, and copolymerizing said resin and said vinyl monomers upon said substrate with polymerization effecting electrons at a potential in the range of about 150,000 to about 450,000 electron volts.

9. A method of coating a substrate which comprises applying to said substrate a film of paint binder having an average depth in the range of about 0.1 to about 4 mils and comprising a film-forming solution of a silicone-modified polyester resin in vinyl monomers copolymerizable with said resin by ionizing radiation, said resin having a molecular weight in the range of about 2,000 to about 20,000 and containing about 1 to about 2 olefinic unsaturation units per 1,000 units molecular weight and being further characterized in that about 20 to about wt. percent thereof is derived from an $Si_6$ to $Si_{12}$ cyclic siloxane, said vinyl monomers comprising a monomer mixture containing a major amount of acrylic monomers and a minor amount of vinyl hydrocarbon monomers, and copolymerizing said resin and said vinyl monomers upon said substrate with polymerization effecting electrons at a potential in the range of about 150,000 to about 450,000 electron volts.

10. A method of coating a substrate which comprises applying to said substrate a film-forming solution containing, on a pigment and mineral filler-free basis, about 30 to about 70 wt. percent of a silicone-modified organic resin and about 30 to about 70 wt. percent vinyl monomers copolymerizable with said resin by ionizing radiation, said resin having an average molecular weight in excess of about 1,000 and containing about 0.5 to about 3 olefinic unsaturation units per 1,000 units molecular weight and being further characterized in that at least 10 wt. percent thereof is derived from a cyclic siloxone, and copolymerizing said resin and said vinyl monomers upon said substrate with polymerization effecting electrons.

11. A method of coating a substrate which comprises applying to said substrate a film-forming solution containing, on a pigment and mineral filler-free basis, about 50 to about 70 wt. percent of a silicone-modified polyester resin and about 30 to about 50 wt. percent vinyl monomers copolymerizable with said resin by ionizing radiation, said resin having an average molecular weight in the range of about 2,000 to about 20,000 and containing about 1 to about 2 olefinic unsaturation units per 1,000 units molecular weight and being further characterized in that about 15 to about 50 wt. percent thereof is derived from an $Si_3$ to $Si_{18}$ cyclic siloxane, and copolymerizing said resin and said vinyl monomers upon said substrate with polymerization effecting electrons at a potential in the range of about 150,000 to about 450,000 electron volts.

12. A method of coating a substrate which comprises applying to said substrate a film-forming solution containing, on a pigment and mineral filler-free basis, about 30 to about 50 wt. percent of a silicone-modified polyester resin and about 50 to about 70 wt. percent vinyl monomers copolymerizable with said resin by ionizing radiation, said resin having an average molecular weight in the range of about 2,000 to about 20,000 and containing about 1 to about 2 olefinic unsaturation units per 1,000 units molecular weight and being further characterized in that about 15 to about 50 wt. percent thereof is derived from an $Si_3$ to $Si_{18}$ cyclic siloxane, and copolymerizing said resin and said vinyl monomers upon said substrate with polymerization effecting electrons at a potential in the range of about 150,000 to about 450,000 electron volts.

13. A method of coating a substrate which comprises applying to said substrate a film of paint binder comprising a film-forming solution of a silicone-modified organic resin in vinyl monomers copolymerizable with said resin by ionizing radiation, said resin having a molecular weight in excess of about 1,000, containing about 0.5 to about 3 olefinic unsaturation units per 1,000 units molecular weight and being a copolymer of an acyclic alpha-beta unsaturated dicarboxylic acid or the anhydride thereof, a cyclic aliphatic dicarboxylic acid or the anhydride thereof, a polyhydric alcohol consisting of carbon, hydrogen and oxygen, and an $Si_3$ to $Si_{18}$ cyclic siloxane having a dissociable group selected from the group consisting of hydroxyl radicals and hydrocarbonoxy radicals bonded to at least two of the silicon atoms therein, and copolymerizing said resin and said vinyl monomers upon said substrate with polymerization effecting electrons.

14. A method of coating a substrate which comprises applying to said substrate a film of paint binder having an average depth in the range of about 0.1 to about 4 mils and comprising a film-forming solution of a silicone-modified organic resin in vinyl monomers copolymerizable with said resin by ionizing radiation, said resin having a molecular weight in excess of about 1,000, containing about 1 to about 2 olefinic unsaturation units per 1,000 units molecular weight and being a copolymer of a polyester resin and an $Si_3$ to $Si_{18}$ cyclic siloxane having a dissociable group selected from the group consisting of hydroxyl radicals and hydrocarbonoxy radicals bonded to at least two of the silicon atoms therein, said polyester being a copolymer of maleic anhydride, tetrahydrophthalic anhydride and a polyhydric alcohol, and copolymerizing said resin and said vinyl monomers upon said substrate with polymerization effecting electrons at a potential in the range of about 150,000 to about 450,000 electron volts.

15. A method of coating a substrate which comprises applying to said substrate a film of paint binder having an average depth in the range of about 0.1 to about 4 mils and comprising a film-forming solution of a silicone-modified organic resin in vinyl monomers copolymerizable with said resin by ionizing radiation, said resin having a molecular weight in excess of about 1,000, containing about 1 to about 2 olefinic unsaturation units per 1,000 units molecular weight and formed by reacting a polyhydric alcohol with an $Si_3$ to $Si_{18}$ cyclic siloxane having a dissociable group selected from the group consisting of hydroxyl radicals and hydrocarbonoxy radicals bonded to at least two of the silicon atoms and reacting the resulting product with maleic anhydride and tetrahydrophthalic anhydride, and copolymerizing said resin and said vinyl monomers upon said substrate with polymerization effecting electrons at a potential in the range of about 150,000 to about 450,000 electron volts.

16. In a paint comprising a film-forming solution of vinyl monomers and a paint binder resin, the improvement wherein said paint binder resin is a polyester resin having a molecular weight in excess of about 1,000, alpha-beta olefinic unsaturation, and at least two carbon atoms of the principal carbon-to-carbon chain thereof separated by and connected to a divalent cyclic siloxane radical, said resin being further characterized in that about 20 to about 50 wt. percent thereof is derived from a cyclic siloxane containing at least 3 silicon atoms per molecule and said alpha-beta olefinic unsaturation is limited to a concentration in the range of about 0.5 to about 3 units per 1,000 units molecular weight.

17. In a paint comprising a film-forming solution of vinyl monomers and a paint binder resin, the improvement wherein said paint binder resin is a polyester resin having a molecular weight in the range of about 2,000 to about 20,000, alpha-beta olefinic unsaturation, and at least two carbon atoms of the principal carbon-to-carbon chain thereof separated by and connected to a divalent cyclic siloxane radical, said resin being further characterized in that about 20 to about 50 wt. percent thereof is derived from a cyclic siloxane containing at least 3 silicon atoms per molecule and said alpha-beta olefinic unsaturation is limited to a concentration in the range of about 0.5 to about 3 units per 1,000 units molecular weight.

18. In a paint comprising a film-forming solution of vinyl monomers and a paint binder resin, the improvement wherein said paint binder resin is a polyester resin having a molecular weight in excess of about 1,000, alpha-beta olefinic unsaturation, and at least two carbon atoms of the principal carbon-to-carbon chain thereof separated by and connected to a divalent cyclic siloxane radical, said resin being further characterized in that about 20 to about 50 wt. percent thereof is derived from a cyclic siloxane containing about 3 to about 18 silicon atoms per molecule and said alpha-beta olefinic unsaturation is limited to a concentration in the range of about 0.5 to about 3 units per 1,000 units molecular weight.

19. In a paint comprising a film-forming solution of vinyl monomers and a paint binder resin, the improvement wherein said paint binder resin is a polyester resin having a molecular weight in the range of about 2,000 to about 20,000, alpha-beta olefinic unsaturation, and at least two crabon atoms of the principal carbon-to-carbon chain thereof separated by and connected to a divalent cyclic siloxane radical, said resin being further characterized in that about 20 to about 40 wt. percent thereof is derived from a cyclic siloxane containing about 3 to about 18 silicon atoms per molecule and said alpha-beta olefinic unsaturation is limited to a concentration in the range of about 0.5 to about 3 units per 1,000 units molecular weight.

20. In a paint comprising a film-forming solution of about 30 to about 70 wt. percent vinyl monomers and about 30 to about 70 wt. percent paint binder resin on a pigment and mineral filler free basis, the improvement wherein said paint binder resin is a polyester resin having a molecular weight in excess of about 1,000, alpha-beta olefinic unsaturation, and at least two carbon atoms of the principal carbon-to-carbon chain thereof separated by and connected to a divalent cyclic siloxane radical, said resin being further characterized in that about 20 to about 50 wt. percent thereof is derived from a cyclic siloxane containing at least 3 silicon atoms per molecule and said alpha-beta olefinic unsaturation is limited to a concentration in the range of about 0.5 to about 3 units per 1,000 units molecular weight.

21. In a paint comprising a film-forming solution of vinyl monomers and a paint binder resin, the improvement wherein the paint binder resin is a copolymer of an acyclic alpha-beta unsaturated dicarboxylic acid or the anhydride thereof, a cyclic olefinic dicarboxylic acid or the anhydride thereof, a polyhydric alcohol consisting of carbon, hydrogen and oxygen, and a cyclic siloxane containing about 3 to about 18 silicon atoms per molecule and having a dissociable group selected from the group consisting of hydroxyl radicals and hydrocarbonoxy radicals bonded to at least two of the silicon atoms therein, said resin being further characterized in that 20 to 50 wt. percent thereof is derived from said cyclic siloxane and in that it has alpha-beta olefinic unsaturation limited to a concentration in the range of about 0.5 to about 3 units per 1,000 units molecular weight.

22. In a paint comprising a film-forming solution of vinyl monomers and a paint binder resin, the improvement wherein said paint binder resin is a copolymer of maleic anhydride, tetrahydrophthalic anhydride, a polyhydric alcohol consisting of carbon, hydrogen and oxygen, and a cyclic siloxane containing about 3 to about 18 silicon atoms per molecule and having a dissociable group selected from the group consisting of hydroxyl radicals and hydrocarbonoxy radicals bonded to at least two of the silicon atoms therein, said resin being further characterized in that 20 to 50 wt. percent thereof is derived from said cyclic siloxane and in that it has alpha-beta olefinic unsaturation limited to a concentration in the range of about 0.5 to about 3 units per 1,000 units molecular weight.

References Cited
UNITED STATES PATENTS

| | | | |
|---|---|---|---|
| 2,842,517 | 7/1958 | Shorr | 260—827 |
| 2,849,527 | 8/1958 | Rogers et al. | 260—827 |
| 2,900,277 | 8/1959 | Schmitz et al. | 204—159.13 |
| 3,065,158 | 11/1962 | Zack | 204—159.13 |
| 3,246,054 | 4/1966 | Guenther et al. | 117—93.31 |

MURRAY TILLMAN, *Primary Examiner.*

J. T. GOOLKASIAN, *Assistant Examiner.*

U.S. Cl. X.R.

117—132, 161; 204—159.15, 159.19; 260—46.5, 827